Jan. 15, 1929.
H. MAXWELL
1,699,150
INDUCTION MOTOR ROTOR
Filed March 30, 1928
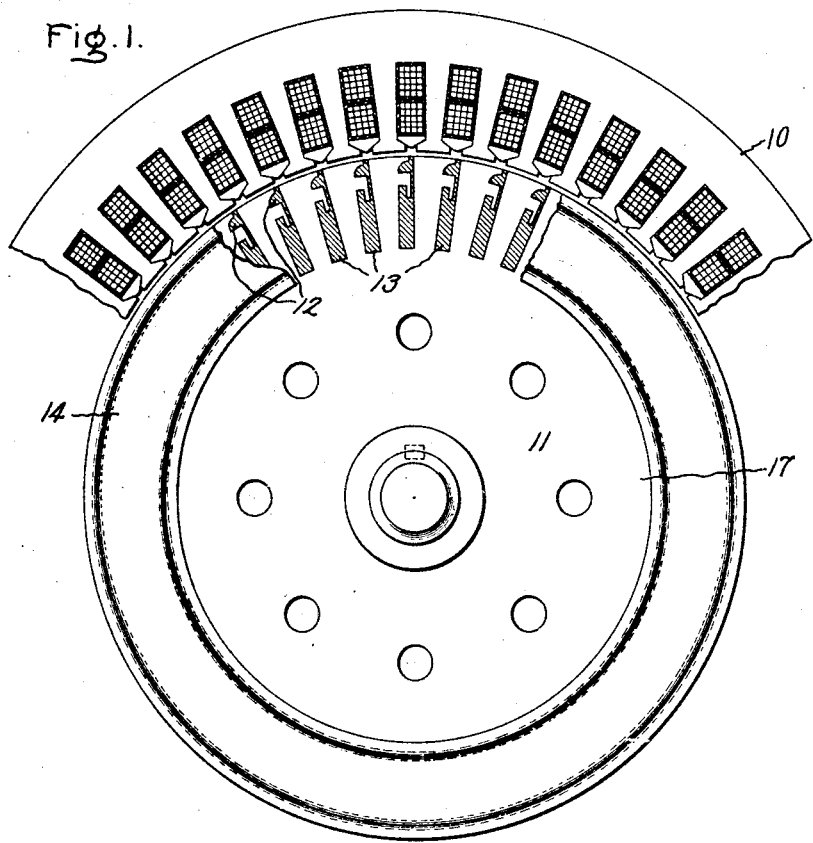
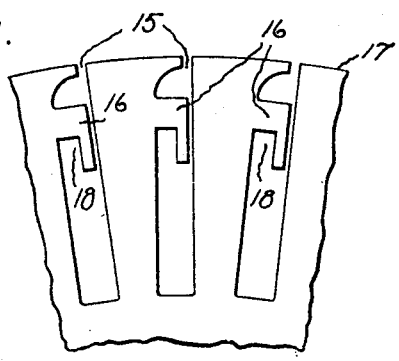
Inventor:
Howard Maxwell,
by Charles E. Mullan
His Attorney.

Patented Jan. 15, 1929.

1,699,150

UNITED STATES PATENT OFFICE.

HOWARD MAXWELL, OF SCHENECTADY, NEW YORK, ASSIGNOR TO GENERAL ELECTRIC COMPANY, A CORPORATION OF NEW YORK.

INDUCTION-MOTOR ROTOR.

Application filed March 30, 1928. Serial No. 266,055.

My invention relates to induction motor rotors.

Double squirrel cage induction motors are ordinarily designed so that the outer squirrel cage is of high resistance and low reactance and the inner squirrel cage is of high reactance and low resistance. The reactance of the inner squirrel cage is usually made of the desired value by narrowing the slots in which the windings are arranged between the inner and outer squirrel cages. If it is desired to make the slots between these windings narrow enough to magnetically saturate the slot leakage path of the low resistance winding when the current therein is equal to some predetermined value, I have found that in many instances the slots must be made so narrow that it is very difficult to accurately punch the laminations or otherwise form the slots in the core structure or the rotor.

The object of my invention is to make a rotor of this character of such form that the magnetic path between the low and high resistance winding will become saturated when the current in the low resistance winding reaches a predetermined value without the necessity of making the slots between the windings so narrow as to be difficult to manufacture. I accomplish this by extending portions of the core structure of the rotor over the low resistance winding to form a path for the leakage flux of said winding, providing an air gap in this portion of the core structure, and forming this portion of the core structure of largest cross-section adjacent the air gap and of reduced cross-section adjacent the sides of the winding slots. In this way I am enabled to make the slots between the windings wide enough so that the rotor can be readily manufactured, and yet produce saturation of the path between the windings at a predetermined value so that the low resistance winding will have the desired characteristics.

My invention will be more fully set forth in the following description referring to the accompanying drawing and the features of novelty which characterize my invention will be pointed out with particularity in the claims annexed to and forming a part of this specification.

In the drawing, Fig. 1 is an end view of a rotor and a portion of the stator of an induction motor embodying my invention, and Fig. 2 is an enlarged view of a portion of a rotor lamination showing the form of winding slot employed.

Referring to the drawing, I have shown my invention in connection with a double squirrel cage induction motor having a stator 10 provided with the usual winding and a rotor 11 including a high resistance winding 12, and a low resistance, high reactance winding 13 which are short-circuited by end rings 14 at each end thereof. In this construction the rotor is designed to have such characteristics that when it is started, as for instance, by applying reduced voltage to the stator winding, the current in the low resistance rotor winding increases during the starting period, with the increase in voltage, to a maximum corresponding to the current flowing therein at maximum torque at full voltage. On the other hand the rotor may be designed so that the current in the low resistance winding increases gradually to a maximum when full voltage is applied to the stator in starting. In either case it is apparent that unless the slot leakage path about the low resistance winding becomes saturated there will be substantially no change in its reactance as the current therein increases. If, however, the reactance of the low resistance winding can be caused to decrease when the current therein reaches the value equal to that at maximum torque, higher maximum torque will be obtained. In order, therefore, to increase the maximum torque of the motor I form the rotor slots 15, in which the windings are arranged, so that the slot leakage path becomes saturated when the current in the low resistance winding 13 is approximately equal to that at maximum torque. This increases the maximum torque of the motor because saturation of the leakage path reduces the reactance of the winding, resulting in increased current in the winding 13 at maximum torque. The slot leakage path of the low resistance winding 13 is caused to become saturated in this way by forming a portion 16 of the core structure in each slot of the rotor so that it extends from one side of the slot over the low resistance winding and in spaced relation to the other side of the slot, the portion being of largest cross-section at the end thereof which is in spaced relation to one side of the slot and of reduced cross-section between the end thereof and the other side of the slot from which it extends. These portions may be formed as separate parts inserted in the slot, or in any other suitable manner, but in the construction illustrated, they are formed integrally with the core structure by notching the laminations 17 of the core structure at 18, as shown in Fig. 2. The reduced cross-section is made such that the leakage flux of the low resistance winding passing therethrough does not saturate the same during the starting period until the current in the winding becomes approximately equal to the current therein at maximum torque. In this way the reactance of this winding is high enough to limit the current therein during the initial part of the starting period and is lowered at maximum torque of the motor so that higher maximum torque is obtained and the power factor at maximum torque is improved.

Modifications of the form of my invention disclosed will occur to those skilled in the art so that I do not intend my invention to be limited to the particular construction shown and described except as defined in the appended claims.

What I claim as new and desire to secure by Letters Patent of the United States is:

1. A rotor for induction motors comprising a slotted magnetic structure having a winding arranged in said slots, said magnetic structure extending over said winding to form a path for the leakage flux of said winding and having a narrow air gap therein, the portions of said magnetic structure extending over said winding being of largest cross-section adjacent the air gap and of reduced cross-section adjacent the side of said slots.

2. A rotor for induction motors comprising a slotted magnetic structure having a winding arranged in said slots, and portions of said magnetic structure extending over said winding from one side of each of said slots in spaced relation to the other side thereof, said portions being of largest cross-section adjacent the ends thereof spaced from the side of the slot and of reduced cross-section between the ends thereof and the other side of the slot from which they extend.

3. A rotor for induction motors comprising a laminated magnetic structure having slots formed therein and a winding arranged in said slots, and portions of said laminations extending over said winding from one side of each of said slots in spaced relation to the other side thereof, said portions being of largest cross-section adjacent the ends thereof spaced from the side of the slot and being notched to form reduced cross-sections between the ends of said portions spaced from the side of the slot and the other side thereof from which they extend.

4. A rotor for induction motors comprising a slotted magnetic structure having a plurality of windings arranged in said slots, and portions of said magnetic structure extending between said windings and from one side of each of said slots in spaced relation to the other side thereof, said portions being of largest cross-section adjacent the ends thereof spaced from the side of the slot and being of reduced cross-section between the ends thereof spaced from the side of the slot and the other side of the slot from which they extend.

5. A rotor for induction motors comprising a laminated magnetic structure having slots formed therein and a plurality of windings arranged in said slots, and portions of said laminations extending between said windings and from one side of each of said slots in spaced relation to the other side thereof, said portions being notched to form reduced cross-sections between the ends thereof spaced from the side of the slot and the other side of the slot from which they extend.

6. A rotor for induction motors comprising a laminated magnetic core structure having slots formed therein, a high resistance winding arranged in said slots adjacent the outer periphery of said core structure and a low resistance winding arranged in said slots inside of said high resistance winding, and portions of the laminations of said core structure extending from one side of each of said slots between said windings and in spaced relation to the other side thereof, said portions being of reduced cross-sections between the ends thereof spaced from the side of the slot and the other side of the slot from which they extend.

7. A rotor for induction motors comprising a laminated magnetic core structure having slots formed therein, a high resistance winding arranged in said slots adjacent the outer periphery of said core structure and a low resistance winding arranged in said slots inside of said high resistance winding, said core structure extending between said windings to form a path for the leakage flux of said low resistance winding and having a narrow air gap therein, the portions of said magnetic structure extending between said windings being of largest cross-section adjacent the air gap and of reduced cross-section adjacent the side of said slots.

In witness whereof, I have hereunto set my hand this 29th day of March, 1928.

HOWARD MAXWELL.